United States Patent Office 3,702,836
Patented Nov. 14, 1972

3,702,836
POLYMER DISPERSIONS
Derek John Walbridge, Beaconsfield, England, assignor to Imperial Chemical Industries Limited, London, England
No Drawing. Filed July 6, 1970, Ser. No. 52,693
Claims priority, application Great Britain, July 4, 1969, 33,871/69
Int. Cl. C08f 47/20; C08g 53/18; C08j 1/48
U.S. Cl. 260—29.1 R
7 Claims

ABSTRACT OF THE DISCLOSURE

Physical properties, e.g. gloss and adhesion, of coatings obtained from coating compositions based on dispersions of film-forming thermoplastic non-crosslinkable polymer in organic liquid are improved when the stabiliser for the disperse particles of polymer contains reactive crosslinkable groups which are crosslinked at the time of application of the coating composition by a crosslinking agent present in the organic liquid.

---

This invention relates to new dispersions of particles of polymer in organic liquids and to coating compositions based on such dispersions.

In our British patent specifications Nos. 941,305, 1,052,241, 1.095,931, 1,095,932, 1,122,397, 1,123,611 and 1,143,404 and French patent specifications Nos. 93,606 and 1,552,075 we have described polymer dispersions in which the polymer particles are stabilised by a stabiliser the essential features of which are that it comprises a component which serves to attach the stabiliser to the surface of the polymer particles (this may be termed the anchor component) and another component which is solvated by the liquid in which the particles are dispersed and provides a stabilising steric sheath around the dispersed particles. Many of these dispersions are suitable for use in coating compositions, particularly those dispersions in which the polymer is a thermoplastic non-crosslinkable polymer such as a polymer or copolymer of an acrylate or methacrylate or a vinyl ester such as vinyl acetate or vinyl chloride.

We have found that coating compositions based on so-stabilised dispersions of thermoplastic non-crosslinkable polymers are improved in respect of adhesion, cohesion and durability of the coating produced from the compositions when the stabiliser for the polymer particles of the dispersion contains reactive groups which are crosslinked on application of the composition.

The crosslinking agent for the reactive groups of the stabiliser should be present in the liquid of the polymer dispersion, no significant proportion of the agent being present in the dispersed polymer itself. Further, the proportion of agent in the coating composition should not be significantly more than that required to crosslink the stabiliser present in the coating composition. This proportion will vary according to the reactive group functionality of the stabiliser, the crosslinking functionality of the agent and the degree of crosslinking required, but normally will not be more than 10% by weight of the total film-forming material present in the coating composition and usually will not be greater than 5% (the term "film-forming material" has its conventional meaning and inclures plasticisers as well as polymers). This proportion of crosslinking agent is less than that normally used when the objective is to modify the characteristics of the film produced from coating compositions in which the main film-forming material is a non-crosslinkable polymer; this is because any crosslinking agent, being unable to chemically modify the non-crosslinkable main polymer, can only modify the film as a result of its physical presence in the film and normally a proportion of less than 10% by weight of the total film-forming material will not provide any significant modifying effect.

The particular type of dispersed polymer (including copolymers) is not critical to this invention except that it should be thermoplastic and non-crosslinkable and for use in coating compositions it should have the appropriate characteristics known by paint technologists to be required. Many suitable polymers are described in the above-mentioned patent specifications and include those of vinyl acetate, vinyl chloride, and other esters of vinyl alcohol, esters of unsaturated acids, e.g. acrylic, methacrylic, fumaric, itaconic and maleic, and vinyl benzenes, e.g. styrene and vinyl toluene. It is particularly suitable where the disperse polymer is one containing on average at least 75% by weight of methyl methacrylate since these polymers have such excellent film-forming characteristics that normally no substantial addition of a crosslinking agent is made to improve the film formed from the coating composition. The methyl methacrylate may be copolymerised with, for example, other acrylic monomers, e.g. esters of acrylic or methacrylic acids or the acids themselves.

Where the stabiliser is to be crosslinked at ambient temperatures the crosslinking agent may be added to the coating composition just before application.

The stabilisher may be attached to the polymer particles by a polymeric component as described, for example, in British specifications Nos. 941,305, 1,052,241, 1,122,397 and 1,123,611 and French specification No. 1,552,075, or by interaction of polar groups as described in British patent specification No. 1,143,404 and French specification No. 93,606, or by additional covalent bonds as described in Belgium Pat. No. 717,718. However, where attachment is by interaction between polar groups comprising part of the dispersed particle and complementary polar groups contained in the stabiliser the polar groups in the particle should not be of a type which would become involved in the crosslinking process. Equally the crosslinking process must not result in a loss of adhesion between the stabiliser and the particle.

The general requirement of the stabiliser is that it shall provide the steric barrier around the particles as described in the above-mentioned specifications. A specific requirement of this invention is that the solvated component and/or the anchor component of the stabiliser shall also contain reactive groups which are to be crosslinked on application of the coating composition.

Through the crosslinking agent for the reactive groups in the stabiliser must be dissolved or dispersed in the liquid of the dispersion there may in some cases be a small equilibrating proportion of the agent in the polymer itself. However, as explained above, this must not be so high as to give rise to a significant amount of crosslinking within the particle itself. The crosslinking agent may contain reactive groups which are complementary to those in the stabiliser or which catalyse crosslinking of the reactive groups in the stabiliser.

The reactive groups in the stabiliser and in the crosslinking agent may be those used in conventional condensation-type crosslinking of polymers. Suitable combinations of reactive and complementary reactive groups include:

| Reactive group | Complementary reactive groups |
|---|---|
| Carboxylic acid or sulphonic acid or phosphonic acid or hydroxyl. | Epoxide or alkoxymethyl amides; dialkylamino methyl amides; alkyl carbonyloxymethyl amides. |
| Anhydride or tertiary base | Epoxide. |
| Reactive esters | Amine. |
| Hydroxyl; carboxyl | Masked or blocked isocyanate; N-methylol and alkoxy derivatives; arylmethylol and alkoxy derivatives. |

Where that component of the stabiliser containing the crosslinkable reactive groups is an addition polymer, selected reactive groups may be provided in the polymeric component by use of co-monomers such as:

| Reactive groups | Co-monomer |
| --- | --- |
| Carboxylic acid | (Meth)acrylic acid, maleic acid, alkyl hydrogen maleates, itaconic acid, citraconic acid, fumaric acid, crotonic acid, methylenemalonic acid. |
| Sulphonic aicd | Vinyl sulphonic acid. |
| Phosphonic acid | Vinyl phosphonic acid. |
| Hydroxyl | Partial esters of polyols and (meth)acrylic, maleic, fumaric and crotonic acid, (meth)allyl and crotyl alcohol. |
| Anhydride | (Meth)acrylic anhydride, maleic anhydride. |
| Tertiary base | Dialhylaminoalkyl (meth)acrylic or anhydride, vinyl pyridine. |
| Reactive esters | Cyanomethylacrylate, alkylcarbonyloxymethyl acrylate. |
| Epoxide | Glycidyl (meth)acrylate, epoxyalkyl (meth) acrylate, mono-reaction products of diepoxy resins and (meth)acrylic acid. |
| Alkoxymethyl amides, dialkylamino-methyl amides, alkylcarbonyloxymethyl amides. | Alkoxymethyl (meth)acrylamides, dialkylaminomethyl-(meth)acrylamides, alkylcarbonyloxymethyl (meth) acrylamides. |
| Amine | Ally amine, vinyl amine. |
| Masked or blocked isocyanate. | Mono-adducts of polyisocyanate with hydroxyalkyl (meth)acrylate reacted with phenol, alkyl mercaptan or aceto-acetic ester, vinyl isocyanate/phenol adduct. |

Where that component of the stabiliser containing the crosslinkable reactive group is a condensation polymer, selected reactive groups may be provided in the polymeric component by an excess of one of the groups taking part in the condensation reaction by which the polymeric component is prepared. For example, where the polymeric component is a polyester, unreacted hydroxyl or carboxyl groups may be used as crosslinkable groups. Similarly, when the polymeric component is a polyamide or polyesteramide, unreacted amine, carboxyl or the amide groups themselves may be used as crosslinkable groups.

Where the condensation reaction is between A groups and B groups, these excess unreacted groups may be terminal unreacted groups in a polymeric component made by condensation of A—A compounds with B—B compounds or by self-condensation of A–B compounds. Preferably, the excess is provided by use in a condensation reaction of a stoichiometric excess of an A—A—A compound or by use in a self-condensation reaction of an A—A—B compound. For example, where a hydroxyl group is required for crosslinking a polyester component of a stabiliser, a reactant used to make the polyester in an alkyd-type reaction may be glycerol or in a self-condensation reaction, dimethylol propionic acid, dihydroxystearic acid, or copolyesters of such acids with hydroxyacids, e.g. 12-hydroxystearic acid. Alternatively, dimethylol propionic acid may be used in an alkyd-type reaction with a dicarboxylic acid which involves the hydroxyl groups but not the carboxyl group of the dimethylol propionic acid, these residual carboxyl groups then being available for crosslinking.

Another way of providing crosslinkable reactive groups in the stabiliser is by modification of existing groups in the stabiliser. For example, existing groups such as amide groups present in a polyamide or polyesteramide or in an addition polymer by copolymerisation with acrylamide or methacrylamide, may be converted to N-methylol amides or N-alkoxymethyl amides by reaction with formaldehyde or mixtures of alcohols and formaldehyde or hemiformals. This conversion may take place after formation of the dispersion of polymer particles and particularly so when the desired crosslinkable group would have an effect on or would be affected by the polymerisation reaction by which the polymer particles are made.

Suitable crosslinking agents for use in solution or dispersion in the liquid of the polymer dispersion include:

| Crosslinkable group in stabiliser | Crosslinking agent |
| --- | --- |
| Hydroxyl amine, methylol amide or alkoxymethylol amide, carboxyl amide. | Melamine formaldehyde condensates, urea formaldehyde condensates, phenol formaldehyde condensates. |
| Carboxyl, anhydride, hydroxyl epoxide, amine. | Epoxy resins. |
| Carboxyl, hydroxyl, amine, amide. | Isocyanates. |

Preferably the crosslinkable reactive groups in the stabiliser are located in the solvated component though in cases where the liquid of the dispersion, and consequently the solvated component of the stabiliser, is non-polar this puts a limit on the proportion of polar reactive groups which may be present in the solvated component if it is still to be sufficiently non-polar to be solvated by the non-polar liquid.

In general it is preferred that the degree of crosslinking to be achievable in the final coating is such that about one crosslink is associated with each portion of solvated component of 1,000–5,000 molecular weight, i.e. where the stabiliser molecule contains solvated component in total of say 10,000 molecular weight it preferably contains from 2 to 10 reactive groups which are to be crosslinked. Where the solvated component of 10,000 molecular weight is present as a single polymer chain at least some of the crosslinkable groups should be present in this chain.

In pigmented coating compositions based on stabilised polymer dispersions, the pigment particles themselves may also be stabilised in disperse form by a stabiliser similar to those used to stabilise polymer particles, i.e. one containing an anchor component and a solvated component. The anchor component of this pigment dispersant may optionally contain polar groups to assist pigment dispersion such as are described in British patent specifications Nos. 1,108,261 and 1,159,252. In pigmented coating compositions to which the present invention is applied it is preferred, in a further embodiment of our invention, that the stabiliser for the pigment also contains reactive groups which may be crosslinked with those of the polymer stabiliser or which may crosslink with additional crosslinking agent on application of the coating composition. The crosslinkable reactive groups may be incorporated in the pigment stabiliser by means described above with respect to the polymer stabiliser. The proportion of crosslinking agent present in the coating composition will need to be augmented for crosslinking of the pigment stabiliser but again the proportion should not be significantly greater than that required for crosslinking the total stabiliser present in the coating composition.

The invention is illustrated by the following descriptions in which all parts are by weight.

Dispersions of poly(methyl methacrylate) particles stabilised in a predominantly aliphatic hydrocarbon liquid by a dispersion stabiliser containing a multiplicity of crosslinkable hydroxyl groups distributed along the solvated component were prepared in the following manner:

Preparation of Stabiliser A

The following components were weighed into a vessel fitted with stirrer, reflux condenser and water separator and thermometer:

|  | Parts |
| --- | --- |
| 12-hydroxystearic acid (technical grade) | 900 |
| Dimethylol propionic acid | 268 |
| Petroleum fraction SBP No. 6 (boiling range 140–165° C.) | 117 |

The reaction mixture was maintained at reflux between 160° C. and 180° C. whilst removing water until the polyester so-formed had an acid value of 31 mg. KOH/gm. resin and a hydroxyl value of 96 mg. KOH/gm. resin. The polyester was converted to a dispersion stabiliser by reaction of the terminal carboxylic acid group with glycidyl methacrylate and subsequent copolymerisation of the resulting monomer with methyl methacrylate and methacrylic acid in the ratio 50:49:1 polyester-glycidyl methacrylate adduct/methyl methacrylate/methacrylic acid. Details of this method of preparation have been described in British patent specification No. 1,122,397. The final solution of stabiliser had a polymer content of 31% in a mixture of butyl acetate and ethyl acetate and hydroxyl value of 63 mg. KOH/gm. polymer.

Preparation of stabiliser B

A dispersion stabiliser was prepared by copolymerising the adduct of poly(12-hydroxystearic acid) and glycidyl methacrylate with methyl methacrylate and methacrylic acid in the ratio 50:49:1 respectively by the method described in British patent specification No. 1,122,397, to give a final polymer content of 33% in solution and a hydroxyl content of 18 mg. KOH/gm. polymer.

Preparation of poly(methyl methacrylate) dispersion C

The following materials were weighed into a vessel fitted with a stirrer, reflux condenser and provision for feeding monomer and stabiliser solution into the returning reflux stream of petroleum liquid.

|  | Parts |
|---|---|
| Petroleum fraction SBP No. 2 (boiling range 70–90° C.) | 510 |
| Petroleum fraction SBP No. 6 (boiling range 140–165° C.) | 90 |
| Methyl methacrylate | 32.5 |
| Stabiliser B solution | 10 |
| Azobisisobutyronitrile | 1.65 |

This mixture was refluxed for 20 minutes to form a fine polymer seed; 15 parts of n-butanol were then added. The following mixture was fed in over 3 hours and the dispersion refluxed for a further 30 minutes.

|  | Parts |
|---|---|
| Methyl methacrylate | 714 |
| Stabiliser A solution | 100.8 |
| p-Octyl mercaptan | 2.43 |
| Azobisisobutyronitrile | 1.65 |

The product was a low viscosity fluid dispersion of 55% polymer content and average particle diameter 9.15–0.2 micron.

Preparation of poly(methyl methacrylate) dispersion D

A poly(methyl methacrylate) dispersion with similar polymer content and physical characteristics was prepared by the method of dispersion C above, but using stabiliser B in place of stabiliser A in the feed of monomer and stabiliser.

Preparation of pigment stabiliser E

A pigment stabiliser containing crosslinkable hydroxyl groups and suitable for use in non-aqueous dispersion coating compositions was prepared as follows:

A copolyester of dimethylol propionic acid (268 parts) and 12-hydroxystearic acid (900 parts) was prepared and reacted with glycidyl methacrylate in the manner described in the preparation of Stabiliser A. A mixture of 472 parts of this product (70% solution in petroleum fraction SBP No. 6), 252 parts methyl methacrylate, 12 parts glycidyl methacrylate, and 12 parts azobisisobutyronitrile was fed over 1 hour into a refluxing mixture of 305 parts petroleum fraction SBP No. 6 and 40 parts of 62/68 hexane fraction which was held at reflux at 130° C. for a further hour. To the resulting polymer solution was added 7 parts p-nitrobenzoic acid and 0.6 part dimethyl lauryl amine, a tertiary amine catalyst and the mixture held at reflux for one hour. The final solution had a non-volatile content of 56%. For use in coating compositions detailed in subsequent examples, this solution was reduced to 30% non-volatile content by the addition of xylene.

EXAMPLE 1

Clear acrylic car lacquer compositions were prepared as detailed in the table below in order to evaluate the properties of the crosslinked stabilisers:

|  | 1 | 2 | 3 | 4 |
|---|---|---|---|---|
| Dispersion C |  |  |  | 78.5 |
| Dispersion D | 78.5 | 78.5 | 78.5 |  |
| Standard pigment dispersant [1] | 2.5 | 2.5 |  |  |
| Pigment stabiliser E |  |  | 2.5 | 2.5 |
| Di-cyclohexanol phthalate | 8.0 | 8.0 | 8.0 | 8.0 |
| Isobutyl cyclohexanol phthalate | 6.0 | 6.0 | 6.0 | 6.0 |
| Petroleum fraction SBP No. 2 | 4.2 | 4.2 | 4.2 | 4.2 |
| Melamine formaldehyde resin [2] |  | 4.0 | 4.0 | 4.0 |

[1] The standard pigment dispersant was a 80:17:3 lauryl methacrylate/methyl methacrylate/dimethylaminoethyl methacrylate copolymer in which the amine groups had been quaternised with p-nitrobenzyl chloride.

[2] A 50% solution in butanol of a conventional melamine formaldehyde resin with a medium level of butylation.

Before application each sample was thinned in the ratio 100:120 sample/thinner with a mixture of β-ethoxy ethyl acetate 40 parts, diethylene glycol monobutyl ether acetate 15 parts, SBP No. 2 25 parts and SBP No. 6 20 parts. The lacquers were sprayed over undercoated steel panels and stoved for half an hour at 135° C. Part of each panel was then sprayed with an additional coat of lacquer. This recoated portion was then placed on a thermal gradient bar to give a range of stoving temperatures from 75° C. to 145° C. The panels were assessed for humidity resistance (16 hours at 60° C., 100% relative humidity) of the single and recoated portions and adhesion to undercoat of the first coat. The results are tabulated below:

| Lacquer ref. No. | Humidity test | | Adhesion |
|---|---|---|---|
|  | Single coat | Recoat |  |
| 1 | Poor gloss, definite whitening. | Severe whitening up to 145° C. | Poor. |
| 2 | Good gloss | No whitening above 120° C. | Good. |
| 3 | Very good gloss | No whitening above 110° C. | Very good. |
| 4 | do | No whitening above 105° C. | Do. |

These results demonstrate the advantages of crosslinking the disperse phase stabiliser, the best results being obtained when both polymer and pigment stabilisers are crosslinked.

EXAMPLE 2

Acrylic lacquer compositions were prepared from the polymer dispersions C and D using either a standard pigment dispersant as described in Example 1 or the crosslinkable dispersant E. The coating compositions were applied in the presence and absence of added melamine formaldehyde resin and evaluated by the method given in Example 1. Full formualtions and manufacturing procedure were as follows:

|  | 1 | 2 | 3 |
|---|---|---|---|
| Titanium dioxide | 15.00 | 15.00 | 15.00 |
| Pigment stabiliser E |  | 2.10 | 2.10 |
| Standard pigment dispersant (Note 1, Example 1) | 2.10 |  |  |
| Dicyclohexanol phthalate | 6.4 | 6.4 | 6.4 |
| Isobutyl cyclohexanol phthalate | 4.0 | 4.0 | 4.0 |
| n-Butanol |  | 2.0 | 2.0 |

Each of these millbases was ground in a ball mill with steatite balls to give a dispersion <5μ on a Hegmann-type gauge. The millbases were then blended with stirring with the following components.

|  | 1 | 2 | 3 |
|---|---|---|---|
| Dispersion C |  |  | 57.6 |
| Dispersion D | 57.6 | 57.6 |  |
| SBP No. 2 spirit | 9.22 | 9.22 | 9.22 |
| Melamine formaldehyde resin (50% solution) |  | 3.0 | 3.0 |

Each composition was thinned before spray application as described in Example 1. Films of Acrylic Lacquer No. 1 were of only moderate gloss and appearance, had poor adhesion to undercoat and lost adhesion completely on humidity testing. Films of Acrylic Lacquers Nos. 2 and 3 had very good mirror-like gloss, good adhesion to undercoat and much improved retention of these properties on humidity testing.

EXAMPLE 3

A polymeric stabiliser was prepared as for stabiliser B with the modification that a portion of the methyl methacrylate was replaced by hydroxypropyl methacrylate to give an overall composition: poly(hydroxystearic acid), glycidyl methacrylate adduct/methyl methacrylate/hydroxypropyl methacrylate/methacrylic acid in the ratio 50:44:5:1. This stabiliser was then used to make poly-(methyl methacrylate) dispersion by the method described for dispersion C. When formulated into coating compositions containing melamine formaldehyde resin similar to those of Example 2 improved adhesion and gloss retention were obtained.

EXAMPLE 4

A dispersion of a 1:1 copolymer of methyl methacrylate and ethyl acrylate was prepared by the method of dispersion C by replacing part of the methyl methacrylate in the feed stage by ethyl acrylate, to give the correct overall ratio of monomers. A white pigment millbase was prepared by dispersing 80 parts rutile titanium dioxide, 12 parts of the pigment dispersant solution E, 7 parts white spirit and 1 part butanol in a ball mill. A blend of this millbase with the copolymer dispersion was made in the ratio 100:30 copolymer dispersion/millbase. Melamine formaldehyde resin solution and urea formaldehyde resin solution were added to portions of this pigmented composition in the ratio 5 parts melamine formaldehyde or 5 parts urea formaldehyde resin to 100 parts copolymer. Acid catalyst was added together with sufficient butyl carbitol acetate to ensure coalescence of the copolymer dispersion. Films containing either of the aminoplast resins were superior in gloss, adhesion and dirt retention properties to the compositions omitting the crosslinking resins.

EXAMPLE 5

A non-aqueous polymer dispersion stabiliser precursor was prepared in the following manner. To a vessel equipped with stirrer, condenser, premix vessel and monomer feed facilities was charged:

| | Parts |
|---|---|
| Petroleum spirit SBP No. 3 (boiling range 100–120° C.) | 36.6 |
| Petroleum spirit SBP No. 2 (boiling range 70–90° C.) | 24.5 | and raised to reflux. The following mixture was fed in over 3 hours.

| | Parts |
|---|---|
| Lauryl methacrylate | 28.0 |
| Hydroxyethyl methacrylate | 3.0 |
| Glycidyl methacrylate | 1.0 |
| Azobisisobutyronitrile | 0.5 | and the mixture held at reflux to achieve complete conversion. 24.5 parts SBP No. 3 were added and the SBP No. 2 removed by distillation to raise the batch temperature to 110° C., 0.5 part methacrylic acid, 0.02 part hydroquinone and 0.1 part dimethyl lauryl amine were then added and the batch held at temperature until two-thirds of the acid had reacted with the glycidyl methacrylate.

This stabiliser precursor was then used to prepare a dispersion having crosslinkable hydroxyl groups on the solvated component of the stabiliser by the method described below.

The following materials were weighed into a reaction vessel fitted with stirrer, condenser, and provision for feeding monomer solutions into the returning reflux stream and thence into the reaction mixture.

| | Parts |
|---|---|
| SBP No. 2 petroleum spirit | 38.9 |
| Aliphatic hydrocarbon (boiling range 230–250° C.) | 3.4 |
| Stabiliser precursor solution (33% solids) | 6.5 |
| Methyl methacrylate | 7.3 |
| Methacrylic acid | 0.15 |
| Butanol | 2.5 |
| Azobisisobutyronitrile | 0.2 |

This reaction mixture was refluxed for 1 hour to form a fine polymer seed and a feed consisting of:

| | Parts |
|---|---|
| Methyl methacrylate | 42.00 |
| p-Octyl mercaptan | 0.04 |
| Azobisisobutyronitrile | 0.1 |
| Butanol | 2.5 | was added over 3 hours with a final half-hour reflux to complete conversion.

Evaluation of this latex in coating compositions similar to those of Example 2 demonstrated similar advantages of gloss, adhesion and petrol resistance over the standard without hydroxyl groups present in the stabiliser.

EXAMPLE 6

A fluid high solids dispersion of polyvinyl acetate in a hydrocarbon medium, with crosslinkable hydroxyl groups on the solvated component of the polymeric stabiliser, was prepared by the following method. The apparatus was as before-described for dispersion manufacture. The initial charge was:

| | Parts |
|---|---|
| Vinyl acetate | 6.13 |
| Acrylic acid | 0.122 |
| Petroleum fraction SBP No. 2 | 17.5 |
| Odourless white spirit | 17.5 |
| Stabiliser B | 2.63 |
| Azobisisobutyronitrile | 0.307 |

This charge was held at reflux for 20 minutes to form a fine seed. The following mixture was fed in over 2 hours:

| | Parts |
|---|---|
| Vinyl acetate | 32 |
| Stabiliser A | 6 |
| Stabiliser B | 3.2 |
| Azobisisobutyronitrile | 0.078 | and this in turn was followed by a mixture of:

| | Parts |
|---|---|
| Vinyl acetate | 14.8 |
| Azobisisobutyronitrile | 0.035 | fed in over 1 hour. The batch was held at reflux for a further 1 hour to complete conversion.

Air-drying coating compositions were prepared by the method of Example 4 with the modification that 5 parts dibutyl phthalate on 100 parts polyvinyl acetate were incorporated and the butanol omitted. The compositions were blended with Desmodur N, an aliphatic isocyanate in the ratio 5 parts isocyanate per hundred parts polymer, and films brushed on undercoated panels. The resulting films had excellent adhesion, integrity and low dirt retention properties compared with a polyvinyl acetate film containing uncrosslinked stabiliser.

EXAMPLE 7

This invention may be applied to improve dispersion coatings prepared from preformed polymer particles such as poly(vinyl chloride) stabilised in dispersion by polymeric stabilisers anchored to the particle surface by methods described in British patent specification No. 1,143,404. A polymeric stabiliser of this type, but with crosslinkable hydroxyl groups in the solvated component was prepared by the method of Stabiliser A, with the modification that the ratio of monomers employed in the final polymerisation was 40:45:10:5 (dimethylol propionic acid, 12-hydroxystearic acid) copolyester, glycidyl methacrylate adduct/methyl methacrylate/ethyl acrylate/ dimethylaminoethyl methacrylate and the stabiliser was prepared in butyl acetate solution at 44% polymer content. The tertiary amino groups in the polymer were subsequently quaternised by reaction with benzyl chloride.

A semi-glossy poly(vinyl chloride) coating composition was prepared as follows:

| | Part, percent | |
|---|---|---|
| Rutile titanium dioxide pigment | 18.2 | Pigment dispersion, grind to fineness, gauge reading below 5 microns. |
| Antimony trioxide pigment | 2.0 | |
| Pigment dispersant | 1.6 | |
| White spirit (boiling point 170–210° C.) | 3.2 | |
| Polyvinyl chloride powder | 43.0 | PVC dispersion, grind for 6 hrs. in steatite ballmill. |
| Stabiliser | 0.8 | |
| Crosslinkable stabiliser (described above) | 2.9 | |
| Diisodecyl phthalate | 10.7 | |
| White spirit | 7.6 | |
| Silicone fluid (2% solution) | 0.1 | |
| Crosslinkable stabiliser (described above) | 2.0 | |
| Micronised silica | 4.0 | |
| Butylated melamine formaldehyde resin (67%) | 0.8 | |
| White spirit | 3.1 | |
| Total | 100.0 | |

Separate pigment and polymer dispersions were prepared as indicated, and blended in a mixer fitted with paddle-type stirrer, silicone fluid and dispersant, together with the micronised silica, were added and the mixer run for ½ hr. until the silica was thoroughly dispersed. Additions of melamine formaldehyde resin and white spirit, for viscosity adjustment, were finally made.

The composition was applied by reverse-roller coater to pre-treated 20 SWG aluminium sheet to which a suitable primer coating had previously been applied, to obtain an overall dry film thickness of 1.5–2.0 mils. The sheet was finally stoved for 1 minute in an oven to attain a peak metal temperature of 210° C.

Films of this composition have improved resistance to fading and whitening, and exhibit lower dirt retention on exterior exposure.

EXAMPLE 8

A polyesteramide was prepared from the following components using the equipment and method described in the preparation of stabiliser A:

| | Parts |
|---|---|
| 12-hydrostearic acid (technical) | 2,000 |
| ω-Amine undecanoic acid | 223 |
| Xylene | 247 |

The condensation stage was continued until the acid value had fallen to 39 mg. KOH/gm. solid resin. The residual carboxylic acid groups were then reacted with glycidyl methacrylate and the adduct copolymerised with methyl methacrylate and methacrylic acid as in stabiliser A. The polymeric stabiliser so-prepared was used in place of stabilizer A in the preparation of polymer dispersion C to form a fine particle poly(methyl methacrylate) dispersion. This dispersion was employed in similar coating compositions to the acrylic lacquer No. 2 of Example 2 to give improved adhesion and film adhesive strength over the standard formulation.

EXAMPLE 9

A polymer dispersion with a crosslinkable stabiliser and with improved resistance to flocculation on addition of strong solvents was prepared in the following way.

Preparation of stabiliser

The following components:

| | Parts |
|---|---|
| 12-hydroxystearic acid (technical grade) | 2,565 |
| Dimethylol propionic acid | 135 |
| Petroleum fraction SBP No. 6 | 300 |
| Zirconium naphthenate | 27 | were reacted as in the preparation of stabiliser A until the polyester so-formed had an acid value of 28.5 mg. KOH/gm. resin and hydroxy value of 17 mg. KOH/gm. resin. The polyester was converted to a dispersion stabiliser as follows:

(1) reaction of the terminal carboxylic acid groups with glycidyl methacrylate.

A mixture of:

| | Parts |
|---|---|
| Polyester | 1500.00 |
| Glycidyl methacrylate | 119.3 |
| Dimethyl lauryl amine | 1.32 |
| Hydroquinone | 0.66 |
| Petroleum fraction SBP No. 6 | 1260.00 | was refluxed until acid value had dropped to 0.1 mg. KOH/gm. of resin.

(2) copolymerisation of the resulting macro-monomer with methyl methacrylate and glycidyl methacrylate in the ratio 50:45:5 polyester-glycidyl methacrylate adduct:methyl methacrylate:glycidyl methacrylate.

A mixture of:

| | Parts |
|---|---|
| Butyl acetate | 113.8 |
| Ethyl acetate | 227.6 | was refluxed while the following mixture was added over 3 hours to the returning reflux:

| | Parts |
|---|---|
| Methyl methacrylate | 284.0 |
| Glycidyl methacrylate | 31.6 |
| Azobisisobutyronitrile | 13.86 |
| Polyester/glycidyl methacrylate adduct | 607.0 |

The resulting product refluxed for a further 2 hours.
To the final solution of stabiliser the following mixture was added and refluxed until the acid value was 1.1 mg. KOH/gm. resin:

| | Parts |
|---|---|
| Butyl acetate | 714 |
| Hydroquinone | 0.12 |
| Methacrylic acid | 6.38 |
| Dimethyl lauryl amine | 0.64 |

The final stabilizer solution had a polymer content of 31.4%.

Preparation of methyl methacrylate:butyl acrylate copolymer dispersion

A mixture of:

| | Parts |
|---|---|
| Petroleum fraction SBP No. 3 (boiling range 100–120° C.) | 612 |
| Hexane | 306 |
| Heptane | 306 |
| Methyl methacrylate | 64.8 |
| Azobisisobutyronitrile | 5.1 |
| Stabiliser solution | 22.7 | was refluxed for 20 minutes to form a fine polymer seed. The following mixture was then fed into the returning reflux stream over 3 hours:

| | Parts |
|---|---|
| Methyl methacrylate | 1249 |
| Butyl acrylate | 135 |
| Azobisisobutyronitrile | 5.1 |
| p-Octyl mercaptan | 3.0 |
| Stabiliser solution | 302.1 |

The dispersion was refluxed for a further 30 minutes.

The final solids content of the dispersion was 51.2%.

On the addition of the following mixture of solvents:

| | Parts |
|---|---|
| Butyl benzyl phthalate | 540 |
| β-Ethoxy ethyl acetate | 540 |
| Petroleum fraction No. 2 | 254 |
| Petroleum fraction No. 3 | 254 |
| Xylene | 32.4 | to the polymer dispersion in the ratio 1 part dispersion to 1 part solvent mixture, no flocculation of the dispersion was observed, neither was there more than a slight increase in viscosity.

When formulated into coating compositions containing melamine formaldehyde resin similar to those of Example 2, improved adhesion was obtained over primers and on re-coating a first coat of the composition.

Petrol resistance of the composition with added melamine resin was also much superior to the formulation in which the melamine resin was omitted.

EXAMPLE 10

A polymeric stabiliser was prepared in the same way as Stabiliser B with the modification that the proportion of methacrylic acid was raised to give a ratio of 50:45:5 poly(hydroxystearic acid/glycidyl methacrylate) adduct/methyl methacrylate/methacrylic acid. This stabiliser was then used to prepare a poly(methyl methacrylate) dispersion by the method employed for Dispersion D. The resulting dispersion was formulated as a coating composition by the method set out in Example 2 with the exception that the melamine formaldehyde resin was replaced by an equal weight on a polymer solids basis of a diglycidyl ether of diphenylol propane. When applied as a car lacquer over a conventional undercoat and baked for 30 minutes at 135° C. the resulting coating had much improved petrol resistance compared with a similar coating from which the ether had been omitted.

We claim:

1. A coating composition based on a dispersion of particles of thermoplastic non-crosslinkable polymer in an organic liquid, the particles of polymer being stabilized in the organic liquid by a stabilizer containing a solvated component which is solvated by the organic liquid and an anchor component which is adhered to said particles, said stabilizer also containing crosslinkable reactive groups, and the organic liquid containing a sufficient amount of a crosslinking agent to crosslink the reactive groups of the stabilizer on application of the coating composition and improve the adhesion, cohesion and durability of the coating obtained, the amount of crosslinking agent being not more than 10% by weight of the total film forming material present in the coating composition.

2. A coating composition as claimed in claim 1 which is pigmented, the particles of pigment also being siabilised in the organic liquid by a stabiliser containing reactive groups crosslinkable by the crosslinking agent.

3. A coating composition as claimed in claim 1 in which the proportion of crosslinking agent is not more than 5% by weight of the film-forming material present in the coating composition.

4. A coating composition as claimed in claim 2 in which the proportion of crosslinking agent is not more than 5% by weight of the film-forming material present in the coating composition.

5. A coating composition as claimed in claim 1 in which the crosslinkable reactive groups of the stabiliser are located in the solvated component.

6. A coating composition as claimed in claim 2 in which the crosslinkable reactive groups of the stabiliser are located in the solvated component.

7. A coating composition as claimed in claim 1 in which the thermoplastic non-crosslinkable polymer is one containing on average at least 75% by weight of methyl methacrylate.

References Cited

UNITED STATES PATENTS

| 3,317,635 | 5/1967 | Osmond | 260—34.2 |
| 3,382,297 | 5/1968 | Thompson | 260—34.2 |

FOREIGN PATENTS

| 716,027 | 12/1968 | Belgium | 260—34.2 |

ALLAN LIEBERMAN, Primary Examiner

U.S. Cl. X.R.

260—33.6 UA, 34.2, 836, 837, 842, 844, 850, 851, 856